US008553625B2

(12) United States Patent
Shao et al.

(10) Patent No.: US 8,553,625 B2
(45) Date of Patent: Oct. 8, 2013

(54) METHOD AND SYSTEM FOR PERFORMING TASKS ON COLLABORATING WIRELESS DEVICES

(75) Inventors: Huai-Rong Shao, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 800 days.

(21) Appl. No.: 12/263,158

(22) Filed: Oct. 31, 2008

(65) Prior Publication Data

US 2010/0110995 A1    May 6, 2010

(51) Int. Cl.
H04W 4/00 (2009.01)

(52) U.S. Cl.
USPC .......................................... 370/329; 370/310

(58) Field of Classification Search
None
See application file for complete search history.

(56) References Cited

U.S. PATENT DOCUMENTS

| | | | | |
|---|---|---|---|---|
| 7,532,196 | B2 * | 5/2009 | Hinckley | 345/156 |
| 2003/0105812 | A1 | 6/2003 | Flowers et al. | |
| 2004/0013102 | A1 * | 1/2004 | Fong et al. | 370/345 |
| 2006/0291433 | A1 * | 12/2006 | Do et al. | 370/338 |
| 2007/0011179 | A1 * | 1/2007 | Paval | 707/100 |
| 2007/0115819 | A1 * | 5/2007 | Stephens et al. | 370/230 |
| 2008/0216125 | A1 * | 9/2008 | Li et al. | 725/62 |
| 2009/0111378 | A1 * | 4/2009 | Sheynman et al. | 455/41.1 |

FOREIGN PATENT DOCUMENTS

| | | |
|---|---|---|
| JP | 2003186798 A | 7/2003 |
| JP | 2005266882 A | 9/2005 |
| KR | 1020070086492 A | 8/2007 |

OTHER PUBLICATIONS

Notification of Transmittal of the International Search Report and Written Opinion dated May 28, 2010 for International Application No. PCT/KR2009/005955 issued by the Korean Intellectual Property Office, pp. 1-11, Seo-gu, Daejeon, Republic of Korea.
Schwoerer, J., "Possible BAN Uses Case for Multimedia Application", Contribution to IEEE P802.15 BAN study group, Jan. 15, 2007, 14 pages, France.

* cited by examiner

*Primary Examiner* — David Oveissi
(74) *Attorney, Agent, or Firm* — Kenneth L. Sherman, Esq.; Michael Zarrabian, Esq.; Sherman & Zarrabian LLP (57) ABSTRACT

A method and system for performing functions on multiple physical devices, is provided. One implementation involves connecting the physical devices via wireless links, discovering function capabilities of each physical device, wherein a function capability of a physical device comprises a local resource and a virtual resource, and collaborating among the physical devices by wireless communication to provide a set of functions including discovered function capabilities of the collaborating physical devices, wherein each function of the function base can be mapped to one or more of said resources for execution.

61 Claims, 8 Drawing Sheets

METHOD AND SYSTEM FOR PERFORMING TASKS ON COLLABORATING WIRELESS DEVICES

FIELD OF THE INVENTION

The present invention generally relates to performing user tasks on multiple devices, and in particular, to performing user tasks on collaborating devices.

BACKGROUND OF THE INVENTION

With the proliferation of consumer electronics (CE) devices, many users own several CE devices for handling different functions. Multiple devices may be able to perform the same function, an example of which involves a TV, a PC and a personal media player (PMP), each of which provides a video playback function. On the other hand, certain functions may be provided only by one device. For example, high-definition (HD) quality video capture may be only supported by a HD camcorder.

The CE industry has attempted to integrate different functionalities into a single device. An example is the case of cellular phones. However, such attempts have several shortcomings. One shortcoming involves high price of such an integrated device. Another is lack of robustness in that if part of the device malfunctions, all of its functions may be disabled. Yet another shortcoming is that functionality requirements greatly vary from one user to another, and functions of such a device may not satisfy different users. Further, certain functions may be supported in a limited manner by some devices (e.g., text inputting and web browsing on cell phone small screens is frequently annoying).

BRIEF SUMMARY OF THE INVENTION

The present invention provides a method and system for performing functions on multiple physical electronic devices. One embodiment involves connecting the physical devices via wireless links, and discovering function capabilities of each physical device, wherein a function capability of a physical device comprises a local resource and a virtual resource. The physical devices are then managed to operate collaboratively by wireless communication to provide a set of functions including discovered function capabilities of the collaborating physical devices, wherein each function of the function may be mapped to one or more of said resources for execution.

A virtual resource for a physical device may include resources of one or more other physical devices accessible via wireless virtual links. Collaborating among the physical devices by wireless communication may comprise virtual link scheduling utilizing a signaling protocol for device discovery, virtual link set up and tear down. Connecting the physical devices may include: a physical device setting up virtual links substantially simultaneously with multiple other physical devices within its transmission range. Collaborating among the physical devices may include: multiple devices automatically collaborating with each other to provide a virtual device having function capabilities of the collaborating physical devices.

A user task may include one or more functions in the set of functions, wherein collaborating among the physical devices may further include mapping different user tasks to different physical devices with different resources, for execution by the physical devices. Each virtual resource may include a dynamic associated cost factor according to wireless link conditions. Collaborating among the physical devices may further include substantially automatically mapping a user task to one or more physical devices with different resources, for execution by the physical devices.

Further, the virtual resources may be classified according to physical device capabilities, wherein mapping a user task further includes selecting physical devices for collaboration such that the overall cost of executing the task by the collaborating devices meets desired performance criteria. In addition, resource control may be performed utilizing application layer function capabilities to accommodate help low-layer resource control and optimization. The resources may be classified according to capability parameters of associated functions, such that collaborating among the physical devices further includes mapping different user tasks to different physical devices with different resources, for execution by the physical devices and performing a user task by minimizing the overall cost factor while meeting quality of service (QoS) requirements.

Collaborating among the physical devices may further include substantially automatically performing resource borrowing among one or more of said physical devices for execution of a task. Further, performing virtual link scheduling may include performing collaborative virtual link scheduling by time division multiplexing when the same wireless channel is utilized by multiple devices. The physical devices may comprise wireless consumer electronic devices.

These and other features, aspects and advantages of the present invention will become understood with reference to the following description, appended claims and accompanying figures.

DETAILED DESCRIPTION OF THE INVENTION

The present invention provides a method and system for performing functions on multiple physical devices. One embodiment includes connecting the physical devices via wireless links, discovering function capabilities of each physical device, wherein a function capability of a physical device comprises a local resource and a virtual resource. The devices are managed to collaborate via virtual links using virtual link scheduling to provide a set of functions including function capabilities of the collaborating physical devices, wherein each function of the set of functions can be mapped to one or more of said resources for execution. This allows a user with multiple devices to perform a function by collaboration among the multiple devices, while optimize resource usage in different aspects such as power consumption balance.

A wireless virtual link provides wireless communication support between wireless devices. A virtual link need not be dependent on a specific type of transceiver. A wireless virtual link between two devices does not require a direct link between the two devices. As such, a virtual link between two wireless devices can include multiple hops (relay nodes) between the two devices. Therefore, a wireless virtual link may be viewed as a logical or overlay wireless connection. A virtual link may be e.g. an IEEE 802.11 WLAN radio link or a 60 GHz Wireless Personal Area Network (WPAN) link, or combination of multiple types of wireless links.

Wireless virtual link scheduling means performing channel time coordination for utilizing a wireless virtual link, including timing of transmitting different types of information over a wireless virtual link. Virtual link scheduling may involve a signaling protocol for device discovery, virtual link set up and tear down.

In one implementation of the invention, a virtual resource for a physical device includes resources of one or more other physical devices accessible via said wireless virtual links. Virtual link scheduling is utilized for collaborative scheduling using time division multiplexing when the same wireless channel is utilized by multiple wireless devices. Collaborating among the physical devices may involve multiple devices automatically collaborating with each other to provide a virtual device having function capabilities of the collaborating physical devices.

Connecting the physical devices involves a physical device setting up virtual links substantially simultaneously with multiple other physical devices within its transmission range. In this implementation, the physical devices include wireless CE devices.

A user task includes one or more functions in the set of functions. Collaborating among the physical devices involves mapping different user tasks to different physical devices with different resources, for execution by the physical devices. Each virtual resource has a dynamic associated cost factor according to wireless link conditions. The virtual resources are classified according to physical device capabilities. As such, mapping a user task involves selecting physical devices for collaboration such that the overall cost of executing the task by the collaborating devices meets desired performance criteria.

The resources are classified according to capability parameters of associated functions. As such, collaboration among the physical devices involves mapping different user tasks to different physical devices with different resources, for execution by the physical devices and performing a user task by minimizing the overall cost factor while meeting quality of service (QoS) requirements. Resource control utilizing application layer function capabilities is provided to accommodate low-layer resource control and optimization.

As noted, a user task may include one or more functions in the set functions, such that collaborating among the physical devices involves substantially automatically mapping a user task to one or more physical devices with different resources, for execution by the physical devices. Collaborating among the physical devices may also involve automatically performing resource borrowing among one or more of said physical devices for execution of a task.

In one example, performing functions on multiple physical devices is implemented as a wireless function complex (WFC). The WFC involves a managing process that assigns different tasks to different devices with different types of resources to ease a user interaction with multiple devices for performing tasks that requires multiple devices. The WFC also provides power balance mechanisms. The resources in all devices are shared and the devices act as one virtual device to a user.

Accordingly, multiple devices automatically collaborate with each other to let users easily use these devices. From user point of view, the multiple devices act as a one virtual device with rich functionalities. From each device point of view, all other devices wirelessly connected to the device and act as virtual resources of that device.

Complex tasks involving plural functions require collaboration of multiple devices, are automatically performed with minimal user involvement. In addition, system optimization is achieved by coordinating multiple devices wherein, for example, duration of available battery power of a collection of devices can be optimized by moving tasks to devices with longer battery life.

Figure 1:
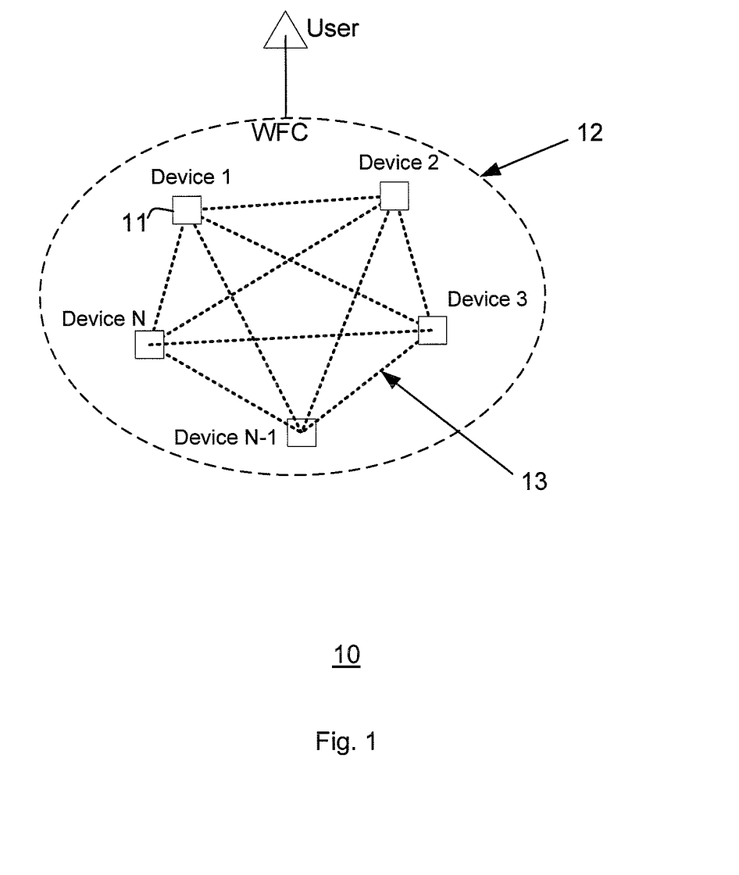
FIG. 1 shows a functional block diagram of a system implementing performing tasks on collaborating wireless devices in a wireless function complex (WFC), according to an embodiment of the present invention.

The WFC allows users to more easily and effectively use devices utilizing wireless connections therebetween. WFC involves multiple devices operating collaboratively via wireless connections, and with limited user involvement. FIG. 1 illustrates a functional block diagram of a system 10 including multiple devices 11 (e.g., Device 1, ..., Device N) which collectively function as one virtual device by implementing WFC 12. The devices 11 are connected by wireless virtual links 13 using wireless transmissions therebetween. A wireless virtual link (or virtual wireless communication channel) is utilized for collaboration between two wireless devices as though a continuous (substantially uninterrupted) direct wireless connection is established between them.

Figure 2:
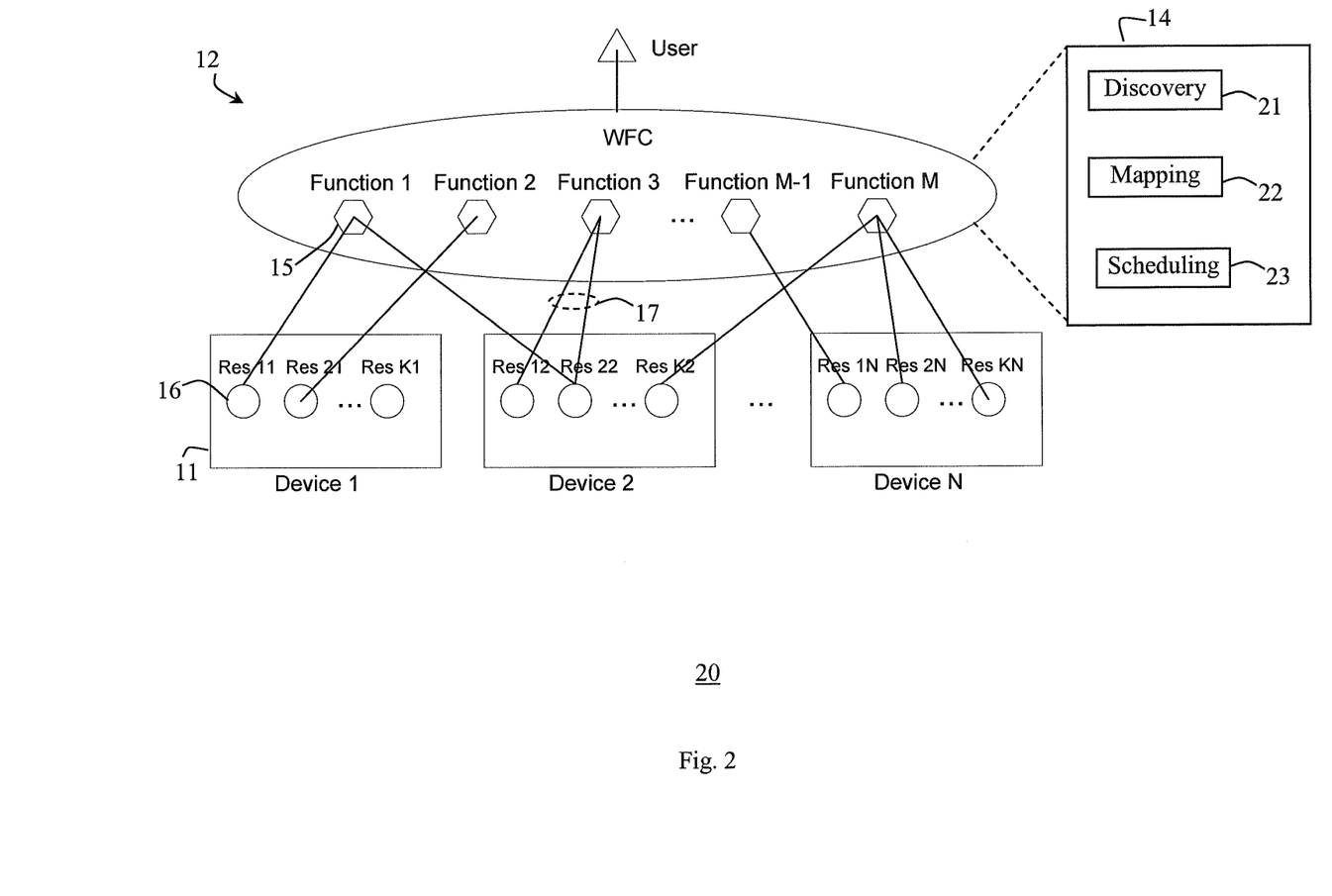
FIG. 2 shows a functional block diagram of function mapping for performing tasks on collaborating wireless devices in a WFC, according to an embodiment of the present invention.

FIG. 2 illustrates a functional architecture 20 for the WFC 12 providing a set of functions implemented as a function base (or function set) for a user, according to an embodiment of the invention. A WFC controller 14 may be implemented in a wireless station (FIG. 2) such as a coordinator, or may be implemented in multiple devices (FIG. 1). The WFC controller 14 provides the function base according to which collaborating devices perform user tasks as described herein. When wireless devices 11 are connected via wireless virtual links, a discovery module 21 of the WFC controller 14 discovers function capabilities of each device 11. To perform a specific user task, a mapping module 22 of the WFC controller 14 uses the functions of the function base by mapping each function of the function base to one or more of local and virtual resources of the devices. A scheduling module 23 of the WFC controller 14 then enables collaboration among the physical devices by virtual link scheduling to provide said function base including function capabilities of the collaborating physical devices. This allows a user with multiple devices to perform a function by collaboration among the multiple devices, while optimizing resource usage in different aspects such as power consumption balance.

In the example shown in FIG. 2, the function base includes multiple functions 15 (e.g., Function 1, ..., Function M) which are based on available functions of the physical devices 11, wherein each device provides one or more resources 16 (e.g., Device 1 has resources Res 11, Res 21, ..., Res K1). Each function of the function base is mapped to one or more resources in the devices using a mapping 17. In the example of FIG. 2, Function 1 is mapped to Res 11 of Device 1 and Res 22 of Device 2; Function 2 is mapped to Res 21 of Device 1; Function 3 is mapped to resources Res 11 and Res 22 of Device 2; Function M-1 is mapped to resource Res 1N of Device N; Function M is mapped to resources Res K2 of Device 2 and Res 2N and Res KN of Device N; and so on. For example, storage functionality can be mapped to the storage resources in a PMP device and in a USB memory stick device. When a function of the function base is mapped to multiple resources, then the resources collaborate to fulfill the function.

In an example WFC operation, when the user is operating a device 11 then all resources in other devices 11 within the same WFC are treated as the virtual resources of that device. For example, when the user is operating the device Device 1, then resources of the devices Device 2, . . . , Device N, within the WFC 12 are treated as the virtual resources of the device Device 1. When the user is operating the device Device 2, then resources of the devices Device 1, Device 3, . . . , Device N, within the WFC 12 are treated as the virtual resources of the device Device 2. And, so on.

Figure 3:
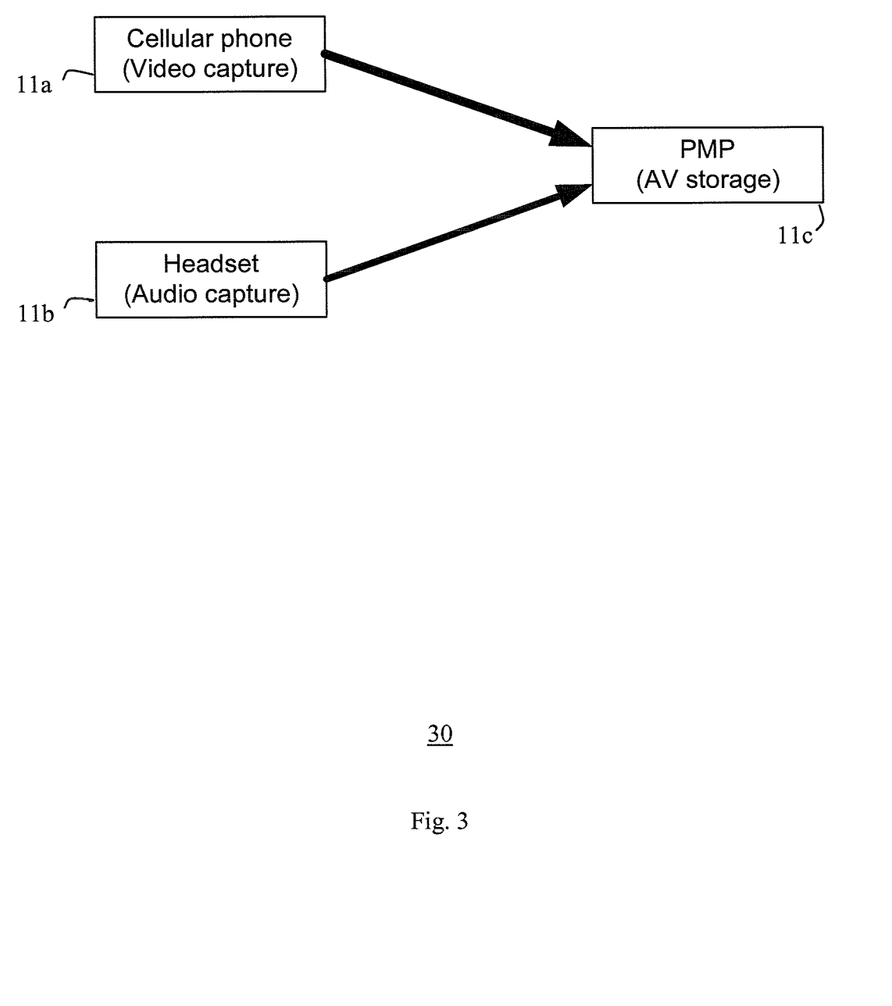
FIG. 3 shows an example distributed AV recording and storage in a WFC, according to the present invention.

In one embodiment, the WFC implements wireless virtual links for communication among the devices. In WFC, information cannot be transferred on one wireless channel in parallel due to interference. For example, a WFC 30 is shown in FIG. 3, including a wireless video capture device 11a, a wireless audio capture device 11b, and a storage device 11c. The devices 11a, 11b, 11c connect wirelessly. Captured video and audio streams by devices 11a, 11b, which cannot be wirelessly transmitted in parallel on the same channel to device 11c due to interference, are instead transmitted by time division multiplexing on the same wireless channel.

Figure 4:
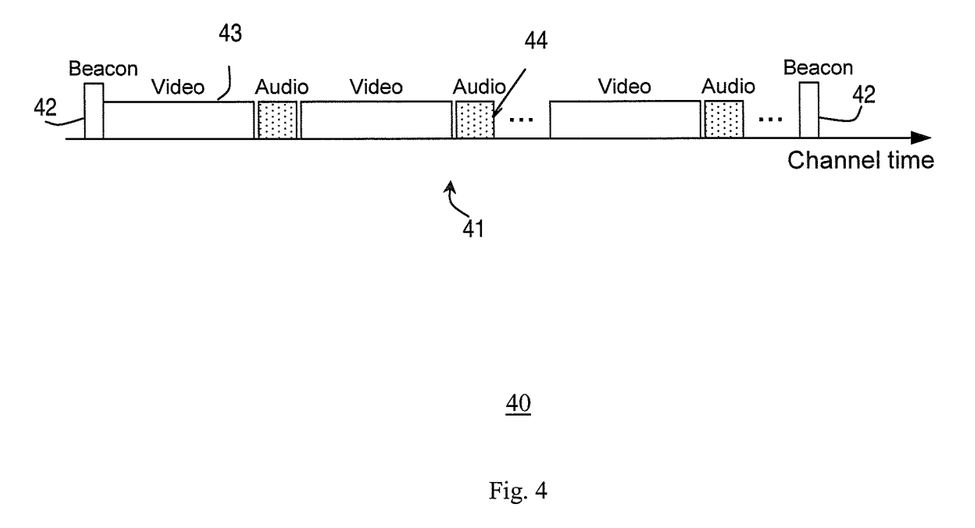
FIG. 4 shows an example of collaborative virtual link scheduling a WFC, according to the present invention.

In WFC, collaborative virtual link scheduling is implemented to meet the application requirements and to avoid interference on the same channel. FIG. 4 illustrates an example of collaborative virtual link scheduling 40 based on time division multiplexing. In a scheduling frame 41 (delimited by a pair of beacons 42), time blocks 43 are used for wireless transmission of video information on a channel, and time blocks 44 are used for wireless transmission of audio information on that channel.

WFC wireless virtual links provide a flexible signaling protocol and mechanism for device discovery, and fast virtual link set up and tear down. No port matching is needed. One wireless device can set up virtual links simultaneously with all other wireless devices in the WFC within its transmission range.

WFC wireless virtual link operation involves consideration of tradeoff between functionality and cost. This is because bandwidth capacity and the cost of a wireless connection can be dynamically changed. For example, the actual available bandwidth depends on the channel condition and the modulation and coding scheme, and the cost of power consumption may depend on the distance between two wireless devices. The dynamics of the bandwidth capacity and the cost are considered in virtual link scheduling.

For resource control optimization, the device resources in a WFC are classified according to functionalities and capability parameters of the associated function. For example, for a video capture resource, capability parameters include frame resolution, frame update frequency, color depth, etc. As notes, each device provides a set functions, wherein each function has two kinds of resources: local resources and virtual resources. Each virtual resource has a dynamic associated cost vector according to the channel condition and other factors. For example, for a cellular phone device, the hard disk in another device (e.g., PMP) in the WFC acts as the virtual storage resource for the cellular phone, and the power consumption cost mainly depends on the distance between the cellular phone and the PMP.

When a user wishes to perform a task using the devices in the WFC, the WFC orchestrates collaboration of devices using local and virtual resources of each device such that the overall cost is preferably minimized in performing the task while meeting QoS requirements associated with the task. In one implementation, the WFC achieves cost reduction by power balance optimization for one or more devices selected to perform a user task.

In one example, the user carries multiple portable devices with different battery capacity capabilities. If a video capture task is requested by the user and there are two devices having such functionality, then the WFC selects a video capture device among the two devices such that the selected device has higher battery capacity if other cost factors are similar among the two devices.

Figure 5A:
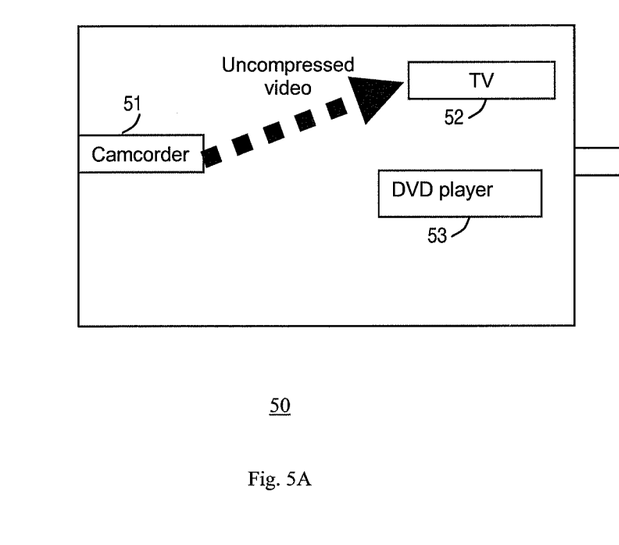
FIGS. 5A-B show examples of collaborative task execution in a WFC for video processing and transmission for power saving, according to the present invention.
Figure 5B:
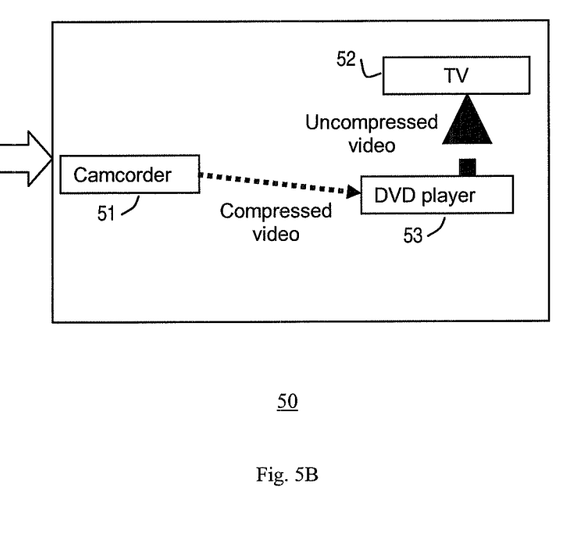

Referring to another example WFC 50 in FIG. 5A, compressed video is stored in a camcorder 51 and the compressed video is decoded by the camcorder and transmitted to a TV 52 as uncompressed video for viewing. In the example WFC 50 in FIG. 5B, instead of decoding the video and transmitting uncompressed video directly to a TV 52, the WFC may select the camcorder 51 to transmit the compressed video to a DVD/BD player 53, wherein the DVD/BD 53 decodes the video and transmits the uncompressed video to the TV 52 for viewing. Therefore, the power consumption at the camcorder 51 is reduced because the camcorder does not perform decoding and instead the DVD/BD 53 performs decoding.

Several example applications of WFC are now described. Users typically utilize their CE devices in a way that multiple devices usually need to be involved to accomplish one task. Conventionally, the user needs to manually determine a procedure to perform the task using the CE devices. The WFC allows execution of tasks at least semi-automatically.

Figure 6:
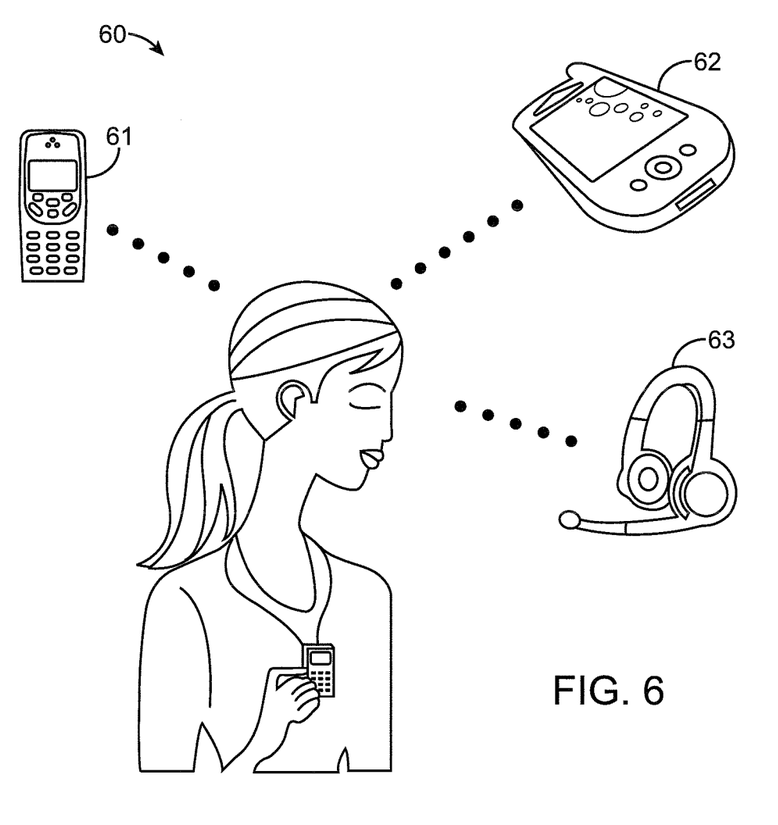
FIG. 6 shows an example WFC for portable CE devices, according to the present invention.

Referring to the WFC 60 in FIG. 6, one example involves audio/video (AV) recording, transmission and playback. A user may carry a cellular phone 61 including a camera, a Personal Media Player (PMP) 62, and a headset 63 for audio playback and recording. The devices 61-63 form a WFC via wireless channels. With WFC, the user can perform AV capturing and storage involving: using the camera in the cellular phone to capture a video clip, use the headset to record his/her audio comments on the video clip, wherein the WFC automatically transmits synchronized audio and video streams to the PMP for storage thereon.

Figure 7:
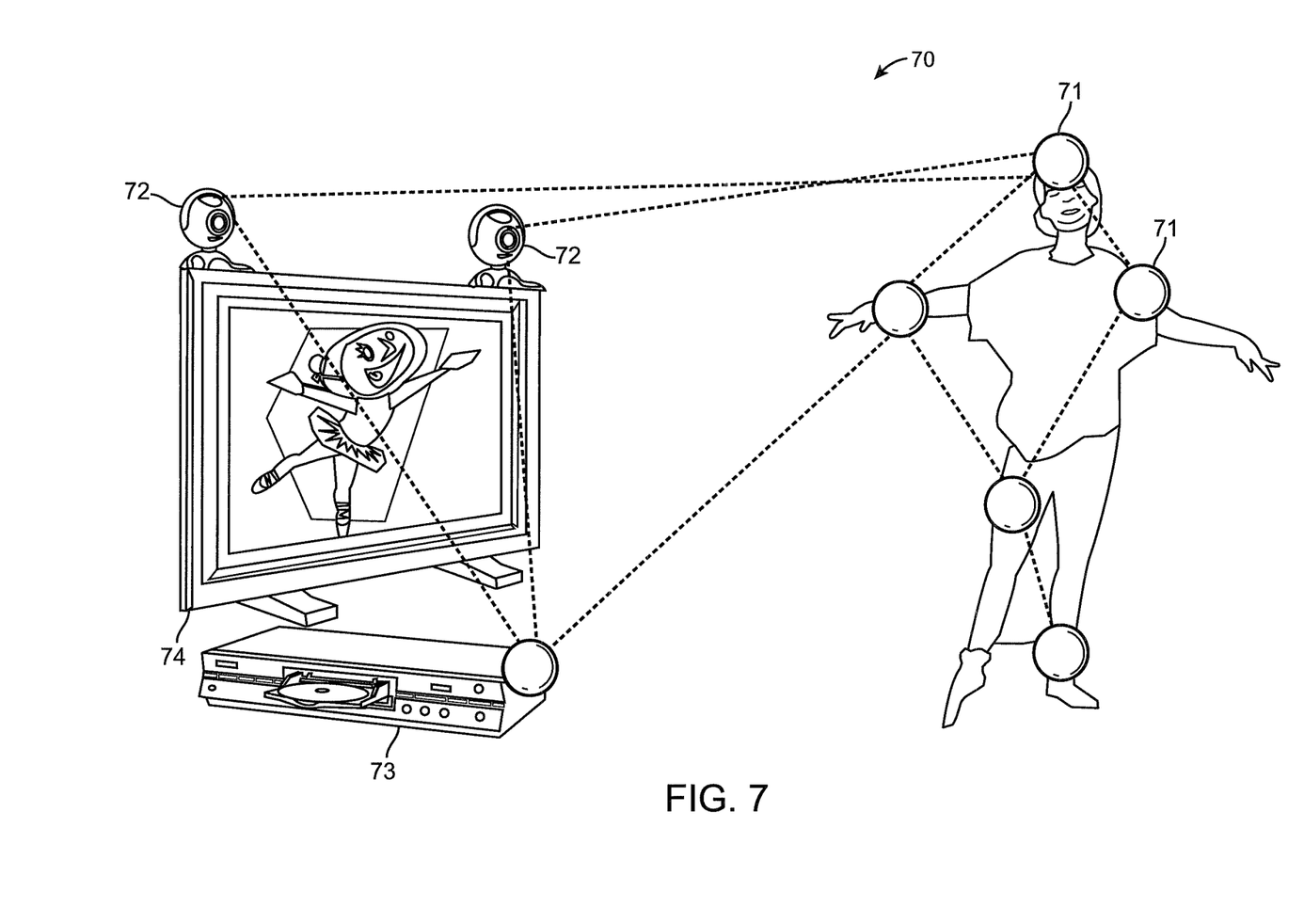
FIG. 7 shows an example WFC for interactive TV/gaming devices, according to the present invention.

Referring to the WFC 70 in FIG. 7, another example involves interactive applications such as interactive TV/gaming shown in FIG. 7. Motion sensors 71 are attached to one or multiple users' arms, legs, heads, etc. Multiple cameras 72 monitor user behavior. A game controller 73 plays an interactive game on the TV 74, wherein the game controller 73 senses user motion and integrates with a game program to display an interactive presentation on the TV 74. The devices 71-74 form a WFC via wireless channels.

Figure 8:
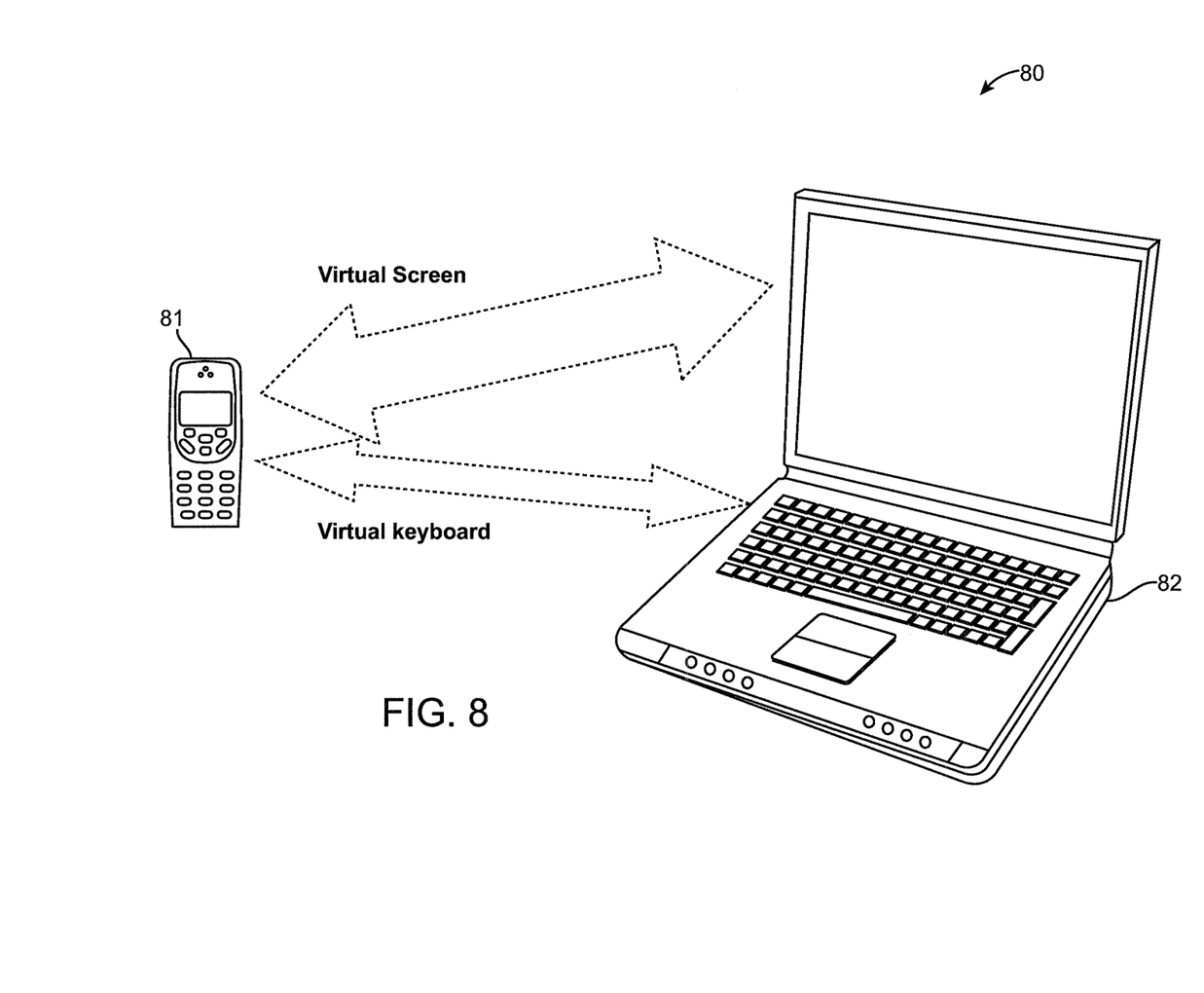
FIG. 8 shows an example WFC for resource borrowing among devices, according to the present invention.

Referring to the WFC 80 in FIG. 8, another example involves resource borrowing, wherein a device can borrow hardware/software resources from other devices. For example, the WFC 80 in FIG. 8 includes a cellular phone 81 and a notebook computer 82, forming a WFC via wireless channels. Since the cellular phone screen and keyboard are usually small, it is not convenient for a user to read/write e-mails or perform web browsing with a cellular phone screen and keyboard. Using WFC, the keyboard and screen of the notebook computer can be borrowed by the cellular phone as virtual screen and virtual keyboard to display and input information for the cellular phone. Another example involves a user wishing to access the Internet using the notebook computer which can only support Ethernet and Wireless Local Area Network (WLAN) access, but not Internet access. WFC allows the notebook computer to use the cellular phone as a virtual network access card, allowing the user to access the Internet through a cellular network.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. Though the present invention has been described with reference to certain versions thereof; however, other versions are possible. Therefore, the spirit and scope of the appended claims should not be limited to the description of the preferred versions contained herein.

What is claimed is:

1. A method of performing functions on multiple physical devices, comprising:
   connecting the physical devices via wireless links;
   discovering function capabilities of each physical device, wherein a function capability of a physical device comprises one or more local physical resources and one or more virtual resources; and
   collaborating among the physical devices by wireless communication to provide a set of functions including discovered function capabilities of the collaborating physical devices, wherein collaborating comprises performing channel time coordination for using a wireless virtual link that includes timing transmission for different types of information over the wireless virtual link, wherein each function can be mapped to one or more of said resources for execution, wherein a virtual resource for a physical device includes resources of one or more other physical devices accessible via wireless virtual links, wherein virtual wireless links comprise logical wireless connections, and wherein physical resources comprise individual resource components of physical devices.

2. The method of claim 1, wherein each available function is mapped to one or more of the local physical resources and the one or more virtual resources of the physical devices.

3. The method of claim 2, wherein collaborating among the physical devices by wireless communication comprises performing virtual link scheduling that includes utilizing a signaling protocol for device discovery, virtual link set up and tear down.

4. The method of claim 3, wherein connecting the physical devices includes: a physical device setting up virtual links substantially simultaneously with multiple other physical devices within its transmission range.

5. The method of claim 4, wherein the physical devices include wireless consumer electronics devices.

6. The method of claim 1, wherein collaborating among the physical devices includes: multiple devices automatically collaborating with each other to provide a virtual device having function capabilities of the collaborating physical devices.

7. The method of claim 1, wherein a user task includes one or more functions in the set of functions, such that collaborating among the physical devices further includes mapping different user tasks to different physical devices with different resources, for execution by the physical devices.

8. The method of claim 7, wherein each virtual resource has a dynamic associated cost factor according to wireless link bandwidth conditions.

9. The method of claim 8 further including classifying the virtual resources according to physical device capabilities.

10. The method of claim 8, wherein mapping a user task further includes dynamically selecting physical devices for collaboration such that the overall cost of executing the task by the collaborating devices meets desired performance criteria.

11. The method of claim 9 further including performing resource control utilizing application layer function capabilities to accommodate low-layer resource control and optimization.

12. The method of claim 8 further including:
   classifying the resources according to capability parameters of associated functions, such that collaborating among the physical devices further includes mapping different user tasks to different physical devices with different resources, for execution by the physical devices and performing a user task by minimizing the overall cost factor while meeting quality of service (QoS) requirements.

13. The method of claim 1, wherein a user task includes one or more functions in the set of functions, such that collaborating among the physical devices further includes substantially automatically mapping a user task to one or more physical devices with different resources, for execution by the physical devices.

14. The method of claim 7, wherein collaborating among the physical devices further includes substantially automatically performing resource borrowing among one or more of said physical devices for execution of a task.

15. The method of claim 3, wherein performing virtual link scheduling further includes performing collaborative virtual link scheduling by time division multiplexing when a same wireless channel is utilized by multiple devices for avoiding interference on the same wireless channel.

16. A system for performing functions on multiple physical devices, comprising:
   multiple physical devices configured for connection via wireless links; and
   a controller configured for performing functions on multiple physical devices, the controller including:
     a discovery module configured for discovering function capabilities of each physical device, wherein a function capability of a physical device comprises one or more local physical resources and one or more virtual resources; and
     a scheduling module configured for enabling collaboration among the physical devices by wireless communication to provide a set of functions including discovered function capabilities of the collaborating physical devices, wherein collaboration comprises performing channel time coordination for using a wireless virtual link that includes timing transmission for different types of information over the wireless virtual link, wherein each function can be mapped to one or more of said resources for execution, wherein a virtual resource for a physical device includes resources of one or more other physical devices accessible via wireless virtual links, wherein virtual wireless links comprise logical wireless connections, and wherein physical resources comprise individual resource components of physical devices.

17. The system of claim 16, wherein each available function is mapped to the one or more local physical resources and the one or more virtual resources of the physical devices.

18. The system of claim 17, wherein the scheduling module is further configured for enabling collaboration among the physical devices by wireless communication including virtual link scheduling utilizing a signaling protocol for device discovery, virtual link set up and tear down.

19. The system of claim 18, wherein each device is configured for setting up virtual links substantially simultaneously with multiple other physical devices within its transmission range.

20. The system of claim 18 further including a mapping module configured for mapping a function of the function set into one or more of said resources, wherein multiple devices automatically collaborate with each other to provide a virtual device having function capabilities of the collaborating physical devices.

21. The system of claim 20, wherein a user task includes one or more functions in the set of functions, and the mapping module is further configured for mapping different user tasks to different physical devices with different resources, for execution by collaborating the physical devices.

22. The system of claim 21, wherein each virtual resource has a dynamic associated cost factor according to wireless link conditions.

23. The system of claim 22, wherein the mapping module if further configured for classifying the virtual resources according to physical device capabilities.

24. The system of claim 23, wherein the mapping module is further configured for mapping a user task by dynamically selecting physical devices for collaboration that is performed such that the overall power consumption cost of executing the task by the collaborating devices dynamically meets desired performance criteria.

25. The system of claim 24, wherein the mapping module is further configured for performing resource control utilizing application layer function capabilities to accommodate low-layer resource control and optimization.

26. The system of claim 23, wherein the mapping module is further configured for classifying the resources according to capability parameters of associated functions, such that collaborating among the physical devices further includes mapping different user tasks to different physical devices with different resources, for execution by the physical devices and performing a user task by minimizing the overall cost factor while meeting quality of service (QoS) requirements.

27. The system of claim 21, wherein a user task includes one or more functions in the set of functions, and the mapping module is further configured such that collaborating among the physical devices further includes substantially automatically mapping a user task to one or more physical devices with different resources, for execution by the physical devices.

28. The system of claim 22, wherein the mapping module is configured for automatically performing resource borrowing among one or more of said physical devices for execution of a task.

29. The system of claim 18, wherein the scheduler is further configured for performing collaborative virtual link scheduling utilizing time division multiplexing when a same wireless channel is utilized by multiple devices for avoiding interference on the same wireless channel.

30. An apparatus for performing functions on multiple physical devices, comprising:
 a discovery module configured for discovering function capabilities of each physical device, wherein a function capability of a physical device comprises one or more local physical resources and one or more virtual resources; and
 a scheduling module configured for enabling collaboration among the physical devices by wireless communication to provide a set of functions including discovered function capabilities of the collaborating physical devices, wherein collaboration comprises performing channel time coordination for using a wireless virtual link that includes timing transmission for different types of information over the wireless virtual link, wherein each function of the set of functions can be mapped to one or more of said resources for execution, wherein a virtual resource for a physical device includes resources of one or more other physical devices accessible via wireless virtual links, wherein virtual wireless links comprise logical wireless connections, and wherein physical resources comprise individual resource components of physical devices.

31. The apparatus of claim 30, wherein a virtual resource for a physical device includes resources of one or more other physical devices accessible via wireless virtual links.

32. The apparatus of claim 31, wherein the scheduling module is further configured for enabling collaboration among the physical devices by wireless communication including virtual link scheduling utilizing a signaling protocol for device discovery, virtual link set up and tear down.

33. The apparatus of claim 32, wherein each device is configured for setting up virtual links substantially simultaneously with multiple other physical devices within its transmission range.

34. The apparatus of claim 33, wherein the physical devices include wireless consumer electronic devices.

35. The apparatus of claim 32 further including a mapping module configured for mapping a function of the function set into one or more of said resources, wherein multiple devices automatically collaborate with each other to provide a virtual device having function capabilities of the collaborating physical devices.

36. The apparatus of claim 35, wherein a user task includes one or more functions in the set of functions, and the mapping module is further configured for mapping different user tasks to different physical devices with different resources, for execution by collaborating the physical devices.

37. The apparatus of claim 36, wherein each virtual resource has a dynamic associated cost factor according to wireless link bandwidth conditions.

38. The apparatus of claim 37, wherein the mapping module is further configured for classifying the virtual resources according to physical device capabilities.

39. The apparatus of claim 37, wherein the mapping module is further configured for mapping a user task by dynamically selecting physical devices for collaboration is performed such that the overall power consumption cost of executing the task by the collaborating devices dynamically meets desired performance criteria.

40. The apparatus of claim 38, wherein the mapping module is further configured for performing resource control utilizing application layer function capabilities to accommodate low-layer resource control and optimization.

41. The apparatus of claim 37, wherein the mapping module is further configured for classifying the resources according to capability parameters of associated functions, such that collaborating among the physical devices further includes mapping different user tasks to different physical devices with different resources, for execution by the physical devices and performing a user task by minimizing the overall cost factor while meeting quality of service (QoS) requirements.

42. The apparatus of claim 35, wherein a user task includes one or more functions in the set of functions, and the mapping module is further configured such that collaborating among the physical devices further includes substantially automatically mapping a user task to one or more physical devices with different resources, for execution by the physical devices.

43. The apparatus of claim 36, wherein the mapping module is configured for automatically performing resource borrowing among one or more of said physical devices for execution of a task.

44. The apparatus of claim 32 wherein the scheduler is further configured for performing collaborative virtual link scheduling by time division multiplexing when a same wireless channel is utilized by multiple devices for avoiding interference on the same channel.

45. The method of claim 1, further comprising dynamically selecting physical devices based on power consumption.

46. The method of claim 45, wherein dynamically selecting physical devices is based on dynamically changed channel bandwidth.

47. The method of claim 46, wherein overall power consumption and bandwidth capacity are minimized for meeting quality of service requirements.

48. The method of claim 45, wherein dynamically selecting physical devices is based on battery capacity.

49. The method of claim 45, wherein dynamically selecting physical devices is based on minimizing power consumption of the physical devices.

50. The method of claim 3, wherein virtual link scheduling is based on channel bandwidth capacity and power consumption cost.

51. The system of claim 20, wherein the mapping module is further configured for mapping a user task by dynamically selecting physical devices for collaboration based on power consumption.

52. The method of claim 51, wherein collaboration based on power consumption comprises adjusting physical resource usage for balancing power consumption among multiple physical devices.

53. The method of claim 1, wherein collaboration further comprises coordinating multiple devices for performing complex user tasks involving multiple functions.

54. The method of claim 53, wherein particular user tasks are assigned to physical devices for maximizing battery life among the physical devices.

55. The method of claim 53, wherein a user task comprises capturing and displaying multimedia using plural physical devices.

56. The method of claim 1, wherein a virtual link comprises one or more wireless links.

57. The method of claim 56, wherein virtual wireless links further comprise multiple relay nodes between at least two physical devices.

58. The method of claim 57, wherein a virtual link further comprises one or more of: a radio link, a 60 GHz link, or combination of a radio link and 60 GHz link.

59. The method of claim 1, wherein each function of the set of functions is mapped to one or more resources in the physical devices.

60. The method of claim 1, wherein the different types of information comprises video information and audio information.

61. The method of claim 60, wherein the video information and the audio information are scheduled in separate time blocks within a same scheduling frame for wireless transmission.

* * * * *